United States Patent
Rennie et al.

(10) Patent No.: US 9,804,045 B2
(45) Date of Patent: Oct. 31, 2017

(54) METHOD OF MANUFACTURING A PRESSURE SENSOR

(71) Applicant: Kidde Technologies, Inc., Wilson, NC (US)

(72) Inventors: Paul Rennie, Bracknell (GB); Paul D. Smith, Camberley (GB)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 365 days.

(21) Appl. No.: 14/264,586

(22) Filed: Apr. 29, 2014

(65) Prior Publication Data

US 2014/0318259 A1    Oct. 30, 2014

(30) Foreign Application Priority Data

Apr. 30, 2013    (GB) .................................. 1307802.7

(51) Int. Cl.
*G01L 7/08* (2006.01)
*G08B 17/04* (2006.01)
*G01L 9/00* (2006.01)

(52) U.S. Cl.
CPC .............. *G01L 7/08* (2013.01); *G01L 9/0042* (2013.01); *G08B 17/04* (2013.01); *Y10T 29/49004* (2015.01)

(58) Field of Classification Search
CPC .......... G01L 7/08; G01L 9/0042; G08B 17/04
USPC ...................... 73/715, 716, 717, 724; 29/593
See application file for complete search history.

(56) References Cited

U.S. PATENT DOCUMENTS

| | | | |
|---|---|---|---|
| 3,122,728 A | 2/1964 | Lindberg, Jr. | |
| 3,760,393 A | 9/1973 | Lindberg | |
| 3,896,423 A | 7/1975 | Lindberg | |
| 5,136,278 A | 8/1992 | Watson et al. | |
| 5,471,723 A * | 12/1995 | Luder et al. .......... | G01L 9/0042 29/25.41 |
| 5,621,389 A | 4/1997 | Fellows | |
| 5,691,702 A | 11/1997 | Hay | |
| 5,802,911 A | 9/1998 | Cahill et al. | |
| 7,775,119 B1 | 8/2010 | Suminto et al. | |
| 8,943,889 B2 * | 2/2015 | Bonnat ..................... | G01P 5/04 73/272 R |

(Continued)

FOREIGN PATENT DOCUMENTS

| | | |
|---|---|---|
| GB | 1016801 A | 1/1966 |
| GB | 2215914 A | 9/1989 |
| WO | 2007117198 A1 | 10/2007 |

OTHER PUBLICATIONS

GB Search Report for Application No. GB1307802.7. Mailed on Sep. 26, 2013. 8 pages.

(Continued)

*Primary Examiner* — Lisa Caputo
*Assistant Examiner* — Roger Hernandez-Prewitt
(74) *Attorney, Agent, or Firm* — Cantor Colburn LLP

(57) ABSTRACT

A method of manufacturing an overheat or fire alarm detection system, comprises the steps of micromachining a pressure sensor and securing a sensor tube in fluid communication with the pressure sensor. The sensor tube may comprise a hollow tube containing a material that evolves gas upon heating. The micromachining step may comprise doping at least a portion of a first layer, forming a cavity at least partially within the doped portion and forming a deformable diaphragm over the cavity.

7 Claims, 2 Drawing Sheets

(56) References Cited

U.S. PATENT DOCUMENTS

| | | |
|---|---|---|
| 2006/0032039 A1 | 2/2006 | Rangsten et al. |
| 2008/0129150 A1 | 6/2008 | Zhang |
| 2009/0236205 A1 | 9/2009 | Nalla et al. |
| 2012/0042731 A1 | 2/2012 | Lin et al. |
| 2012/0167659 A1* | 7/2012 | Besling et al. ...... H01H 35/346 73/1.57 |
| 2012/0186354 A1* | 7/2012 | Okada .................. G01L 9/0042 73/724 |

OTHER PUBLICATIONS

European Search Report for Application No. 14161944.5-1810/2800077, dated Jan. 13, 2015, 9 pages. Author: Plathner, B.

* cited by examiner

METHOD OF MANUFACTURING A PRESSURE SENSOR

CROSS REFERENCE TO RELATED APPLICATIONS

This application claims priority to GB Patent Application No. 1307802.7 filed Apr. 30, 2013, the entire contents of which are incorporated herein by reference.

TECHNICAL FIELD

The present disclosure relates to a pressure sensor for use in an overheat or fire alarm system and in particular to a method of manufacturing a sensor and such a system. Such overheat or fire alarm systems can be used to monitor a number of different environments including various parts of aircraft and other aerospace applications.

BACKGROUND

A known overheat or fire alarm system comprises a sensor tube in fluid communication with a pressure sensor, also known as a pressure switch module. The sensor tube commonly comprises a metallic sensor tube containing a metal hydride core, typically titanium hydride, and an inert gas fill, such as helium. Such a system is shown in U.S. Pat. No. 3,122,728 (Lindberg).

Exposure of the sensor tube to a high temperature causes the metal hydride core to evolve hydrogen. The associated pressure rise in the sensor tube causes a normally open pressure switch in the pressure sensor to close. This generates a discrete alarm. The pressure sensor is also configured to generate an averaging overheat alarm due to the pressure rise associated with thermal expansion of the inert gas fill. The discrete and average alarm states may be detected as either a single alarm state using a single pressure switch or separately using at least two pressure switches.

An example of a single alarm pressure sensor for use with a pneumatic fire/overheat detector is described in U.S. Pat. No. 5,136,278A (Watson). This detector uses two deformable metal diaphragms to form a pneumatic pressure sensor switch. The diaphragms are typically formed from TZM alloy discs which have been subjected to a pressure forming operation to achieve the required pressure set point for the sensor. After pressure forming, the resulting diaphragm is of the order of 5-10 mm in diameter.

Historically, the pressure forming of diaphragms has been carried out prior to final assembly of the pneumatic pressure detector. An improvement to this manufacturing process is described in US2009/0236205 (Nalla). This document discloses a method of performing the pressure forming operation after final assembly of the switch module. Despite this improvement the manufacture of sensors with a consistently repeatable pressure set point is a relatively time consuming and potentially costly procedure.

A further shortcoming associated with known designs is the relatively large internal free volume of the pneumatic pressure switch. Gas within the free volume of the pneumatic pressure sensor will reduce the pressure rise associated with expansion of the inert gas or evolution of hydrogen within the sensor tube. This will have a detrimental effect on the heat detection capabilities of the system. In addition hydrogen gas evolved during a discrete alarm condition may enter the free volume of the pneumatic pressure switch. This hydrogen gas is then no longer in physical contact with the metal hydride core and cannot be reabsorbed upon cooling. This will have a detrimental effect of the ability of the detection system to successfully reset after a discrete alarm event. Both of these effects are more significant for short sensor tube lengths.

The present disclosure seeks to address at least some of these issues.

SUMMARY

There is disclosed herein a method of manufacturing an overheat or fire alarm detection system, comprising the steps of micromachining a pressure sensor and securing a sensor tube in fluid communication with the pressure sensor.

It should be understood that the term 'pressure sensor' is intended to refer to any sensor that can detect a pressure change. The pressure sensor may comprise one or more individual 'pressure switches', each of which will be activated by pressure changes. The switches may be activated by a certain pressure threshold ('pressure set point') to open or close an electrical terminal, thus providing a digital output. An example of a digital pressure switch is a pneumatic pressure detector having a deformable diaphragm. Alternatively, the switches may provide a continuously varying output depending on the pressure, thus providing an analog output. An example of an analog pressure switch is an electronic pressure transducer such as a capacitive or piezo-resistive transducer.

The term 'micromachining' (or 'micro systems technology' (MST)) is well known in the art to refer to the fabrication of three dimensional structures on the micrometer scale. Typically, these structures use semiconductor substrates such as silicon or silicon-based substrates (i.e. wafers), although other substrates could be used. The basic fabrication techniques involve deposition of very thin layers and patterning of the layers and etching. Systems produced using micromachining methods are commonly known as 'micro-electro mechanical systems' (MEMS).

Using micromachining techniques enables pressure sensors having much smaller and more accurate dimensions to be produced. This allows for a more efficient and reliable manufacturing process. A pressure sensor made in this way, may provide a more accurate and reliable response to pressure changes.

The pressure sensor according to the present disclosure may have a greatest overall dimension of 100 μm or less or between 30 μm and 100 μm, or about 30 μm. Each switch may have a greatest overall dimension of 30 μm or less, or 10 μm or less. The greatest overall dimension may be a diameter or a width of a footprint of the sensor/switch.

Micromachining techniques can also provide pressure sensors having highly complex geometries whose pressure set points may be more accurately set.

Miniaturising the pressure sensor using micromachining also means that a number of pressure switches can be produced in a single process on a single substrate. A single sensor tube can be connected to the substrate in fluid communication with a number of different switches. The user may then choose which switch or switches to connect circuitry to in order to monitor desired pressure set points. It may be desired to use a number of different switches having different set points so that various temperature conditions can be monitored, for example, overheat, fire and integrity (to check for leaks in the sensor tube).

The sensor tube may comprise a hollow tube containing a material that evolves gas upon heating. Such a sensor tube is well known, as discussed above. The tube may be made of a metal, such as an Inconel alloy. The material may be a metal hydride, such as titanium hydride. The sensor tube may contain an inert gas fill, such as helium. The sensor tube may have a very large length (e.g. between 1 and 10 meters) relative to its diameter (e.g. less than 5 mm). As such, using a miniaturised pressure sensor allows for a very low profile (i.e. low diameter) overheat/fire alarm detection system.

The micromachining step may comprise forming and/or providing one or more layers. The layers may each have a thickness of 100 μm or less.

The first layer may be a substrate layer upon which other layers are deposited. The first layer may be considered to be a lower or base layer as this may be its orientation during manufacturing. However, it should be understood that the pressure sensor can be manufactured (and subsequently used) in any orientation. The first layer may comprise a semi-conductor material, such as silicon.

The micromachining step may comprise doping at least a portion of a first layer. The doping may be performed in any known suitable way. The doped portion may extend throughout the thickness of the first layer so that the doped portion can be accessed from an underside of the first layer. The first layer may comprises one or more non-doped portions.

The first layer may have a thickness of 100 μm or less.

A plurality of separate doped portions may be provided.

Each doped portion may form an electrical terminal. Closing the electrical terminal may open or close an electrical circuit and trigger an alarm. The doped portion may be connected to any suitable circuitry to provide an alarm circuit. Suitable circuitry is shown in U.S. Pat. No. 5,136,278 (Watson) and U.S. Pat. No. 5,691,702 (Hay) and would be apparent to a person skilled in the art.

The micromachining step may comprise forming a cavity at least partially within the doped portion. A cavity may be formed in the first layer either before or after the doped portion has been created. The cavity is at least partially within the doped portion. As such, at least part of the doped portion forms part of the base and/or one or more walls of the cavity.

A plurality of cavities may be formed, with each cavity being partially within a doped portion.

The cavity may have a depth of less than 1 μm or 0.5 μm or less.

The cavity or cavities may be formed using any known method. For example, the cavity or cavities could be etched. Known etching techniques include wet etching and dry etching.

The cavity may be used to provide a plenum for a pneumatic pressure sensor having a diaphragm. Using micromachining techniques provides a very small cavity of accurate dimensions having a very low internal free volume.

The step of forming one or more layers may comprise forming a deformable diaphragm over the cavity. The diaphragm may be directly or indirectly secured to the first layer. The deformable diaphragm may be formed by depositing a layer of material on the first layer.

The diaphragm may have a thickness of less than 5 μm or 1 μm or less.

It should be understood that while the diaphragm covers the cavity, it may not be in direct contact with the first layer. In other words, there may be one or more intervening layers between the diaphragm and the first layer. The footprint of the diaphragm covers the cavity in the first layer. The diaphragm may be secured to the first layer indirectly via the intervening layer.

In use, the portion of the diaphragm that covers the cavity may move into the cavity when subjected to a fluid pressure acting thereon. The movement of the portion of the diaphragm into the cavity may close an electrical terminal and trigger an alarm. As such, the diaphragm and cavity together form a pressure switch.

The micromachining step may comprise forming a recess in a second surface of the diaphragm. The second surface of the diaphragm faces away from the first layer. During manufacture, the second layer may be positioned above the first layer, but it should be understood that the finished pressure sensor can be manufactured (and subsequently) used in any orientation.

The recess is at least partially aligned with the cavity. As such, the portion of the diaphragm aligned with the recess covers at least a portion of the cavity.

The recess could be formed using any known method. For example, the recess could be etched.

Forming a recess in a portion of the diaphragm aligned with the cavity decreases the stiffness of this portion. By varying the depth of the recess, the pressure set point of the pressure switch can be set. This is because a more flexible portion will deform under a lower pressure. A deeper recess could therefore be used to detect a lower pressure and therefore a lower temperature threshold.

A plurality of separate recesses may be formed.

The recesses and cavities may be circular (when viewed from above), but other shapes are possible.

Forming a plurality of cavities and recesses effectively provides a number of different switches on a single substrate. As discussed above, a number of different switches can be connected to a single sensor tube. Each switch can be actuated at different pressure threshold.

One way of achieving this is by having at least two recesses having different depths. To provide different depths, one recess could be subjected to a higher level (or different type of) etching than another recess.

Alternatively, the depth of the cavities in the first layer could be varied. The deeper the cavity, the more pressure will be required to deform the diaphragm sufficiently to close an electrical terminal within the cavity and trigger an alarm. Again, different cavities could be subjected to different levels (or types) of etching.

There may be two, three or more than three recesses on the diaphragm, with each recess being at least partially aligned with a cavity on the first layer. Each recess may have a different depth.

The diaphragm may be formed of any suitable material. The diaphragm may be formed of a material that provides an effective barrier to hydrogen (which may be evolved from the connected sensor tube), such as silicon nitride (Si3N4). The diaphragm may be formed of a material that can be easily and accurately etched, such as a ceramic (e.g. Si3N4).

The diaphragm may be formed of an electrically insulating material. In order to complete an electrical circuit when a portion of the diaphragm moves into the cavity, the method may comprise forming a flexible, electrically conductive layer between the diaphragm and the first layer. A single conductive layer may extend over all cavities (if present) on the first layer.

Alternatively, the diaphragm may be formed of an electrically conductive material, so that an electrical circuit is completed when a portion of the diaphragm contacts a doped portion of the first layer within a cavity.

The diaphragm and doped portion may provide terminals of an electrical circuit. Closing or opening these terminals may trigger and alarm to indicate that a certain pressure threshold (and thus temperature of the sensor tube) has been detected. Suitable circuitry would be apparent to a person skilled in the art.

The present disclosure extends to a pneumatic pressure sensor comprising a first layer and a deformable diaphragm. The first layer has a plurality of cavities in a first surface. The diaphragm has a first surface facing and covering the cavities and a second surface that faces away from the first layer. The second surface has a plurality of recesses, each of which is at least partially aligned with one of the cavities. At least a first recess has a greater depth than a second recess.

As discussed above, while the diaphragm covers the cavities, it may not directly contact the first layer. Instead, one or more intervening layers may be located between the diaphragm and the first layer.

The first layer and diaphragm may have any of the features described above, in relation to the method of manufacturing an overheat or fire alarm detection system.

Each cavity and recess may provide an individual pressure switch.

The pneumatic pressure sensor may be formed using micromachining.

The first layer may have a thickness of 100 μm or less. The diaphragm may have a thickness of less than 5 μm, or 1 μm or less.

The first layer may comprises a semiconductor wafer having a plurality of doped portions. Each cavity may be at least partially within one of the doped portions.

Each doped region may provide an electrical terminal that is closable by the movement of a portion of the diaphragm into a cavity.

The present disclosure also extends to a method of manufacturing the pneumatic pressure sensor described above. The method comprising the steps of micromachining a first layer having a plurality of cavities in a first surface and micromachining a deformable diaphragm that covers the cavities and has a plurality of recesses of different depths in a second surface that faces away from the first layer.

The present disclosure also extends to an overheat or fire alarm detection system comprising a pneumatic pressure sensor as described above and a sensor tube connected to the sensor in fluid communication with the plurality or recesses.

The overheat or fire alarm detection system may be manufactured as described above.

The present disclosure also extends to a method of manufacturing an overheat or fire alarm detection system, comprising manufacturing a pneumatic pressure sensor as described above and connecting a sensor tube in fluid communication with the plurality of recesses.

BRIEF DESCRIPTION OF THE DRAWINGS

Some exemplary embodiments of the present disclosure will now be described by way of example only and with reference to FIGS. 1 to 2, of which.

The figures are not to scale.

DETAILED DESCRIPTION

Figure 1A:
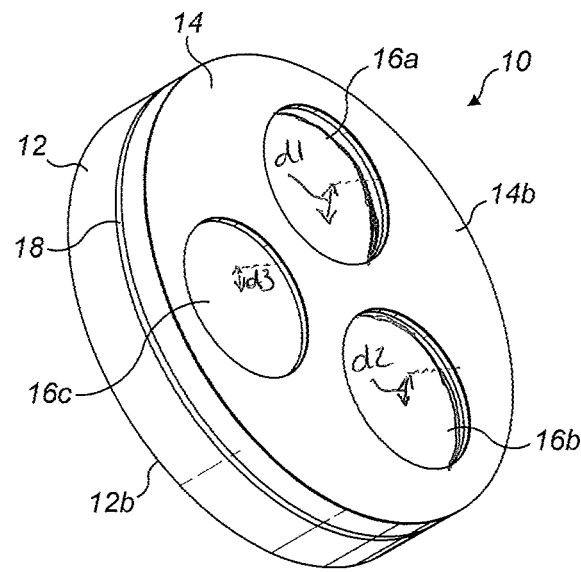
FIGS. 1a to 1c are various views of a pressure sensor according to an exemplary embodiment of the present disclosure.

FIG. 1a shows a perspective view of an exemplary micromachined pressure sensor 10. The sensor 10 comprises a substrate 12 ('first layer') and a deformable diaphragm 14.

The diaphragm 14 may be formed of a ceramic material such as silicon nitride (Si3N4). The substrate 12 may be formed of a semiconductor such as silicon.

The diaphragm 14 comprises three recesses 16a, 16b, 16c in an upper ('second') surface 14b. The recesses 16a, 16b, 16c are circular and equally spaced.

Located between diaphragm 14 and substrate 12 is an intervening electrically conductive, flexible metal layer 18. The metal layer 18 contacts the upper ('first') surface 12a of the substrate 12 and a lower ('first') surface 14a of diaphragm 14. The diaphragm 14, the substrate 12 and the intervening metal layer 18 are all circular and substantially the same size.

The diaphragm 14 and the intervening metal layer 18 may be formed via deposition. Features of the layers, such as recesses 16a, 16b, 16c and cavities 19 may be formed by etching the respective layer.

Figure 1B:
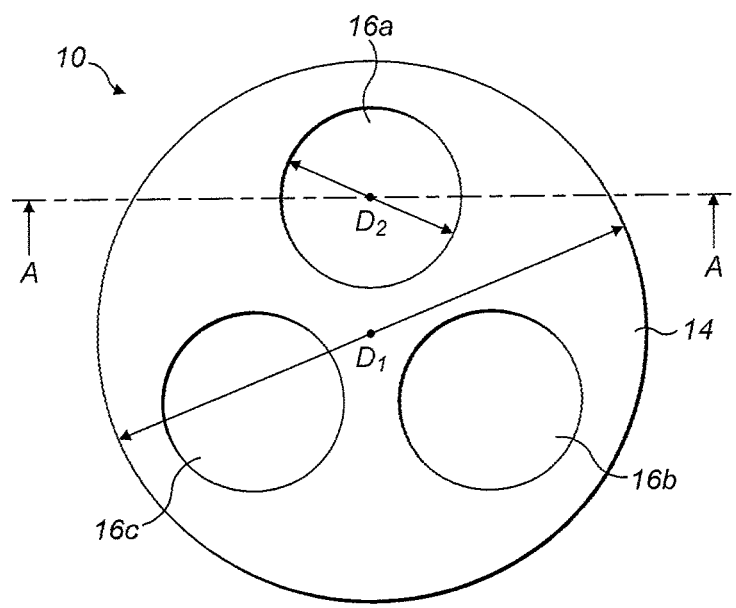

FIG. 1b shows an overhead plan view of the pressure sensor 10. The recesses have a diameter D2 of 10 microns and the diaphragm 14 has a diameter D1 of 30 microns. The diameter of the diaphragm 14 represents the greatest overall dimension of the sensor 10. Other dimensions will be suitable.

Figure 1C:
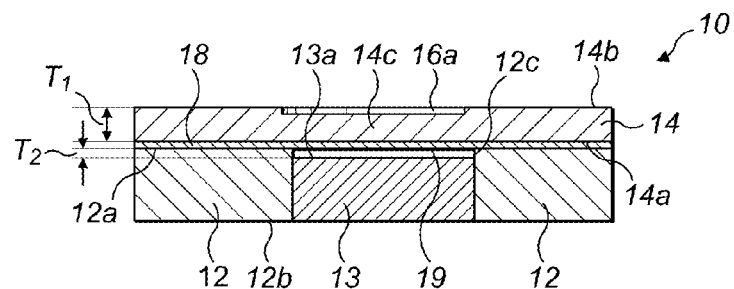

FIG. 1c shows a cross-sectional view of the sensor 10 taken along line A-A in FIG. 1b. As discussed above, the sensor 10 comprises a three layer structure, namely the substrate 12, the metal layer 18 and the diaphragm 14. The substrate 12 comprises doped portion 13 and un-doped portions. A single recess 16a can be seen. Below recess 16a, is a cavity 19 formed in doped portion 13. The cavity 19 is defined between the upper surface 13a of doped portion 13, the walls 12c of the un-doped portion 12 and the lower surface 14a of diaphragm. The cavity 19 is substantially aligned with recess 16a. Similar doped portions and cavities are formed below the two other recesses 16b, 16c.

The thickness of the diaphragm T1 is 1.0 μm and the depth T2 of the cavity 19 in the doped portion is 0.5 μm, although other dimensions will be suitable.

The portion 14c of the diaphragm below the recess 16a, the doped portion 13, the cavity 19 and the intervening metal layer 18 form a pneumatic pressure switch. When subjected to sufficient pressure on its upper surface 14b, the portion 14c will deform into the cavity 19 (carrying with it a portion of metal layer 18). When the metal layer 18 contacts doped portion 13 an electrical circuit (not shown) is completed. This triggers an alarm to indicate that a certain temperature threshold has been detected. The sensor 10 shown, therefore has three distinct switches.

The recesses 16a, 16b, 16c may each have a different depths d1, d2 and d3. This provides a different pressure set point, as the thickness of portion 14c below a recess will be inversely proportional to the amount of pressure needed to deform that portion into a cavity 19. The pressure set point will also depend on the depth of cavity 19 as the portion 14c will have further to deform until it makes contact (via metal layer 18) with doped portion 13.

In use, all three switches may be used to monitor different temperature conditions, such as overheat, fire and integrity. Alternatively, the user may only connect to a switch having a desired pressure set point.

Figure 2:
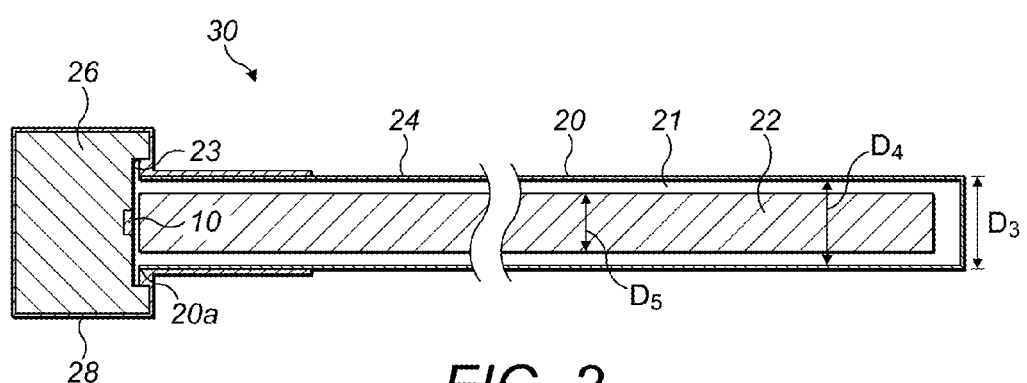
FIG. 2 shows a schematic cross-sectional view of an overheat or fire alarm system according to an exemplary embodiment of the present disclosure.

FIG. 2 shows a cross-sectional view of an exemplary overheat or fire alarm system 30 comprising the sensor 10 (of FIGS. 1a to 1c) secured to a sensor tube 20. The sensor 10 is shown enlarged for illustrative purposes only. A thermal insulation block 26, made for example of ceramic, is attached around the sensor 10. A sleeve 28 is wrapped around block 26 and a part of the sensor tube 20 to ensure a hermetic seal between sensor 10 and tube 20.

The sensor tube 20 comprises an interior space 21 and a solid core 22. The interior space 21 is filled with an inert gas such as helium. The solid core 22 is formed of a material that evolves a gas, such as hydrogen, upon heating. The material may be titanium hydride. The tube 20 comprises a metallic casing 24, made for example of an Inconel alloy. A shallow gap or plenum 23 is formed between sensor 10 (and specifically the upper surface 14b of the diaphragm 14) and a first end 20a of the sensor tube 20. The recesses 16a, 16b, 16c are in fluid communication with the interior 21 of the sensor tube 20.

The sensor tube 20 has an outer diameter D3 of 1.6 mm and an inner diameter D4 of 0.9 mm. The solid core 22 has a diameter D5 of 0.66 mm. Other dimensions will be suitable.

Heating the sensor tube 20 first causes the helium gas to expand. This applies a pressure on the recesses 16a, 16b, 16c. Depending on the pressure set point of each switch, one or more switches may be activated. Further heating of the sensor tube 20 causes the core 22 to evolve hydrogen gas. This causes one or more pressure switches to activate.

One of the pressure switches may provide an integrity alarm if the pressure drops below a certain threshold. The threshold could be set as the normal operating pressure of the helium gas fill. If the pressure drops below this threshold, then it may be indicative of a leak in the sensor tube (or between the tube 20 and the sensor 10). The integrity switch may be normally closed and only open when the pressure drops below the threshold. The opening of the normally closed switch (i.e. the opening of the electric circuit between the metal layer 18 and the doped portion) may trigger an alarm.

The exemplary overheat or fire alarm system 30 can therefore be used to provide a number of different alarm signals indicative of different temperatures or conditions.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A method of manufacturing an overheat or fire alarm detection system, comprising the steps of:
    micromachining a pressure sensor, and
    securing a sensor tube in fluid communication with said pressure sensor;
    wherein said micromachining step comprises:
    forming one or more layers including a first layer,
    doping at least a portion of a first layer to form a doped portion; to form an electrical terminal,
    forming a cavity at least partially within said doped portion; and
    forming a deformable diaphragm over said cavity,
    wherein said micromachining step comprises forming a recess in an upper surface of said diaphragm, said upper surface facing away from said first layer and being at least partially aligned with said cavity, and
    wherein said micromachining step comprises forming at least two recesses having different depths.

2. The method of claim 1, wherein said sensor tube comprises a hollow tube containing a material that evolves gas upon heating.

3. The method of claim 1, wherein said micromachining step comprises:
    forming a plurality of doped portions;
    forming a cavity partially within each doped portion; and
    forming a plurality of recesses in said upper surface, each recess being at least partially aligned with a cavity.

4. The method of claim 1, wherein said step of forming one or more layers comprises forming a flexible, electrically conductive layer between said deformable diaphragm and said first layer.

5. A pneumatic pressure sensor comprising:
    a first layer having a plurality of cavities in a first surface; and
    a deformable diaphragm having:
        a first surface facing and covering said cavities, and
        a second surface facing away from said first layer and having a plurality of recesses, wherein each recess is at least partially aligned with one of said cavities and at least a first recess has a greater depth than a second recess;
    wherein said first layer comprises a semiconductor wafer having a plurality of doped portions and one or more of said cavities is at least partially within one of said doped portions; and
    wherein each doped portion provides an electrical terminal that is closable by the movement of a portion of said diaphragm into one of the plurality of cavities.

6. The pneumatic pressure sensor of claim 5, wherein said first layer and said diaphragm each have a thickness of 100 µm or less.

7. A method of manufacturing the pneumatic pressure sensor of claim 5, comprising the steps of:
    micromachining a first layer having a plurality of cavities in a first surface; and
    micromachining a deformable diaphragm that covers said cavities and has a plurality of recesses of different depths in a second surface of said diaphragm that faces away from said first layer.

* * * * *